(12) United States Patent
Huang et al.

(10) Patent No.: US 11,205,840 B2
(45) Date of Patent: Dec. 21, 2021

(54) RF ENERGY TRANSMITTING APPARATUS WITH POSITIONING AND POLARIZATION TRACING FUNCTION, RF ENERGY HARVESTING APPARATUS AND RF ENERGY TRANSMITTING METHOD

(71) Applicants: DELTA ELECTRONICS, INC., Taoyuan (TW); National Cheng Kung University, Tainan (TW)

(72) Inventors: Tzuen-Hsi Huang, Tainan (TW); Sheng-Fan Yang, Tainan (TW); Chun-Cheng Chen, Tainan (TW); Pei-Jung Chung, Taoyuan (TW); Fang-Ming Wu, Taoyuan (TW)

(73) Assignees: DELTA ELECTRONICS, INC., Taoyuan (TW); NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 16/837,865

(22) Filed: Apr. 1, 2020

(65) Prior Publication Data

US 2020/0227818 A1 Jul. 16, 2020

Related U.S. Application Data

(63) Continuation of application No. 15/825,401, filed on Nov. 29, 2017, now Pat. No. 10,644,393.

(30) Foreign Application Priority Data

Jan. 17, 2017 (TW) .................................. 106101474

(51) Int. Cl.
*H02J 50/20* (2016.01)
*H01Q 1/46* (2006.01)
(Continued)

(52) U.S. Cl.
CPC ............... *H01Q 1/46* (2013.01); *H01Q 1/248* (2013.01); *H01Q 21/245* (2013.01);
(Continued)

(58) Field of Classification Search
CPC ........ H01Q 1/46; H01Q 1/248; H01Q 21/245; H02J 50/001; H02J 50/90; H02J 50/20
See application file for complete search history.

(56) References Cited

U.S. PATENT DOCUMENTS 7,167,090 B1 1/2007 Mandal
2013/0137455 A1 5/2013 Xia et al.

FOREIGN PATENT DOCUMENTS

CN 103151848 6/2013

OTHER PUBLICATIONS

Office Action dated Aug. 17, 2019 from corresponding application No. CN201710035323.8.

*Primary Examiner* — Daniel Cavallari
(74) *Attorney, Agent, or Firm* — Hauptman Ham, LLP

(57) ABSTRACT

An RF energy transmitting apparatus with positioning and polarization tracing function is used for an RF energy harvesting apparatus. The RF energy transmitting apparatus includes a power radar transmitter and a radar controller. The power radar transmitter receives a power source signal and emits an electromagnetic source wave. The radar controller is electrically connected to power radar transmitter and receives a reflected harmonic wave. The power radar transmitter emits the electromagnetic source wave to scan a space. The RF energy harvesting apparatus generates and emits the reflected harmonic wave. The radar controller determines a position and a polarization angle of the RF energy harvesting apparatus after receiving the reflected harmonic wave and to adjust a polarization angle of the power radar transmitter to be within a predetermined angle
(Continued)

range with respect to the polarization angle of the reflected harmonic wave sent from the RF energy harvesting apparatus.

5 Claims, 7 Drawing Sheets

(51) Int. Cl.
  *H01Q 21/24* (2006.01)
  *H01Q 1/24* (2006.01)
  *H02J 50/90* (2016.01)
  *H02J 50/00* (2016.01)
(52) U.S. Cl.
  CPC ............ *H02J 50/001* (2020.01); *H02J 50/20* (2016.02); *H02J 50/90* (2016.02)

RF ENERGY TRANSMITTING APPARATUS WITH POSITIONING AND POLARIZATION TRACING FUNCTION, RF ENERGY HARVESTING APPARATUS AND RF ENERGY TRANSMITTING METHOD

CROSS-REFERENCE TO RELATED APPLICATIONS

This application is a continuing application of U.S. patent application Ser. No. 15/825,401, filed on Nov. 29, 2017, and entitled "RF ENERGY TRANSMITTING APPARATUS, RF ENERGY HARVESTING APPARATUS AND METHOD OF RF ENERGY TRANSMITTING", which claims priority to TW106101474 filed Jan. 17, 2017. The entire disclosures of the above applications are all incorporated herein by reference.

BACKGROUND OF THE DISCLOSURE

Field of the Present Disclosure

The present disclosure relates to an RF energy transmitting apparatus, an RF energy harvesting apparatus and an RF energy transmitting method, especially to an RF energy transmitting apparatus, an RF energy harvesting apparatus and an RF energy transmitting method exploiting harmonic wave for polarization tracing.

Description of Prior Art

As Internet of Things (IOT) attracts more attention, the charging for sensor becomes an important issue. The charging for sensor has enormous business opportunities due to the amount being multiple of the core circuit (data processing center). A part of the sensor has simple circuit function (for example, sending single environmental information such as temperature or a physical sensing quantity to the data processing center) and has few power consumption range between several micro-watts to tens of Nano-watts. Energy harvester technology enabling the sensor itself to get electric energy during work thereof becomes future main stream architecture for IOT sensors. Currently, thermal-electric conversion, piezo-electricity conversion, and electromagnetic conversion have been developed, and RF energy transfer capable of transmitting energy over long distance is more attractive and can save cost and labor of changing the battery of sensor.

In conventional electromagnetic conversion scheme, it mainly focus on the energy harvester for harvesting energy from existing radio or WiFi station. However, polarization match between the antennas of the energy transmitter and the energy harvester poses great challenge. The antenna of the sensor has strict limitation in terms of types and amount in view of compact requirement. For example, the energy harvester at the energy receiving end generally adopts planar antenna formed on the printed circuit board (PCB) and has only one polarization angle due to the limitation of simple circuit, low power consumption and circuit integration requirement. Moreover, the energy transmitter generally has fixed orientation in a wireless energy transferring system having energy harvester and energy transmitter. The energy harvester is difficult to align the polarization angle of its antenna with the antenna polarization of the energy transfer whether a fixed or movable energy harvester is used. And thus, the energy harvesting efficiency is influenced. The energy harvester may use circular-polarized antenna or multiple antennas to enhance energy harvesting efficiency. However, this kind of antenna arrangement increases occupied area. The energy amount received by the energy harvester is fluctuated when only the energy transmitter uses circular-polarized antenna but the energy harvester at energy receiving end does not use circular-polarized antenna.

Therefore, it is important to provide an RF energy transmitting apparatus, an RF energy harvesting apparatus and an RF energy transmitting method with polarization tracing function and positioning function. The RF energy harvesting apparatus at energy receiving end can be correctly positioned when significant reflected harmonic wave from the RF energy harvesting apparatus is received. The RF energy transmitting apparatus then activates polarization tracing function to enhance the RF energy transferring system with the RF energy transmitting apparatus and the RF energy harvesting apparatus.

SUMMARY OF THE PRESENT DISCLOSURE

It is an object of the present disclosure to provide an RF energy transmitting apparatus with positioning and polarization tracing function, an RF energy harvesting apparatus, and an RF energy transmitting method.

Accordingly, the present disclosure provides an RF energy transmitting apparatus with positioning and polarization tracing function used for an RF energy harvesting apparatus. The RF energy transmitting apparatus with positioning and polarization tracing function includes a power radar transmitter and a radar controller. The power radar transmitter receives a power source signal and emits an electromagnetic source wave. The radar controller is electrically connected to power radar transmitter and receives a reflected harmonic wave. A frequency of the electromagnetic source wave is different with a frequency of the reflected harmonic wave. The power radar transmitter emits the electromagnetic source wave to scan a space. The RF energy harvesting apparatus generates and emits the reflected harmonic wave after receiving the electromagnetic source wave. The radar controller determines a position and a polarization angle of the RF energy harvesting apparatus after receiving the reflected harmonic wave and to adjust a polarization angle of the power radar transmitter to be within a predetermined angle range with respect to the polarization angle of the reflected harmonic wave sent from the RF energy harvesting apparatus after adjusting a direction of the electromagnetic source wave toward the RF energy harvesting apparatus, thus enhancing power receiving efficiency for the RF energy harvesting apparatus Accordingly, the present disclosure provides an RF energy harvesting apparatus used for an RF energy transmitting apparatus with positioning and polarization tracing function. The RF energy harvesting apparatus includes an RF transceiver module, a power module, and a resonator. The RF transceiver module receives an electromagnetic source wave and emits a reflected harmonic wave. The power module is electrically connected to the RF transceiver module. The resonator is electrically connected to the RF transceiver module and the power module. The RF transceiver module outputs an alternating voltage source to the power module and generates a reflection signal to the resonator after receiving the electromagnetic source wave. The resonator enhances the reflection signal to form the reflected harmonic wave and outputs the reflected harmonic wave to the RF transceiver module. The RF transceiver module emits the reflected harmonic wave to the RF energy transmitting apparatus with positioning and polarization tracing function after the RF transceiver module receives the reflected harmonic wave such that a polarization angle of the RF energy transmitting apparatus is adjusted to be within a predetermined angle range with respect to a polarization angle of the reflected harmonic wave sent from the RF energy harvesting apparatus.

Accordingly, the present disclosure provides an RF energy transmitting method with positioning and polarization tracing. The method includes steps of: (a) emitting an electromagnetic source wave to scan a space; (b) receiving a reflected harmonic wave from an RF energy harvesting apparatus, wherein a frequency of the electromagnetic source wave is different with a frequency of the reflected harmonic wave; (c) adjusting a direction of the electromagnetic source wave emitted by an antenna array toward the RF energy harvesting apparatus; (d) adjusting a polarization angle of the antenna array; and (e) determining whether the polarization angle of the antenna array is adjusted to be within a predetermined angle range with respect to a polarization angle of the reflected harmonic wave sent from the RF energy harvesting apparatus. When the polarization angle of the antenna array is adjusted to be within the predetermined angle range with respect to the polarization angle of the reflected harmonic wave sent from the RF energy harvesting apparatus, a setting parameter corresponding to the predetermined angle range is recorded to provide a correct polarization direction for a polarization antenna.

BRIEF DESCRIPTION OF DRAWINGS

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE DISCLOSURE

Figure 1:
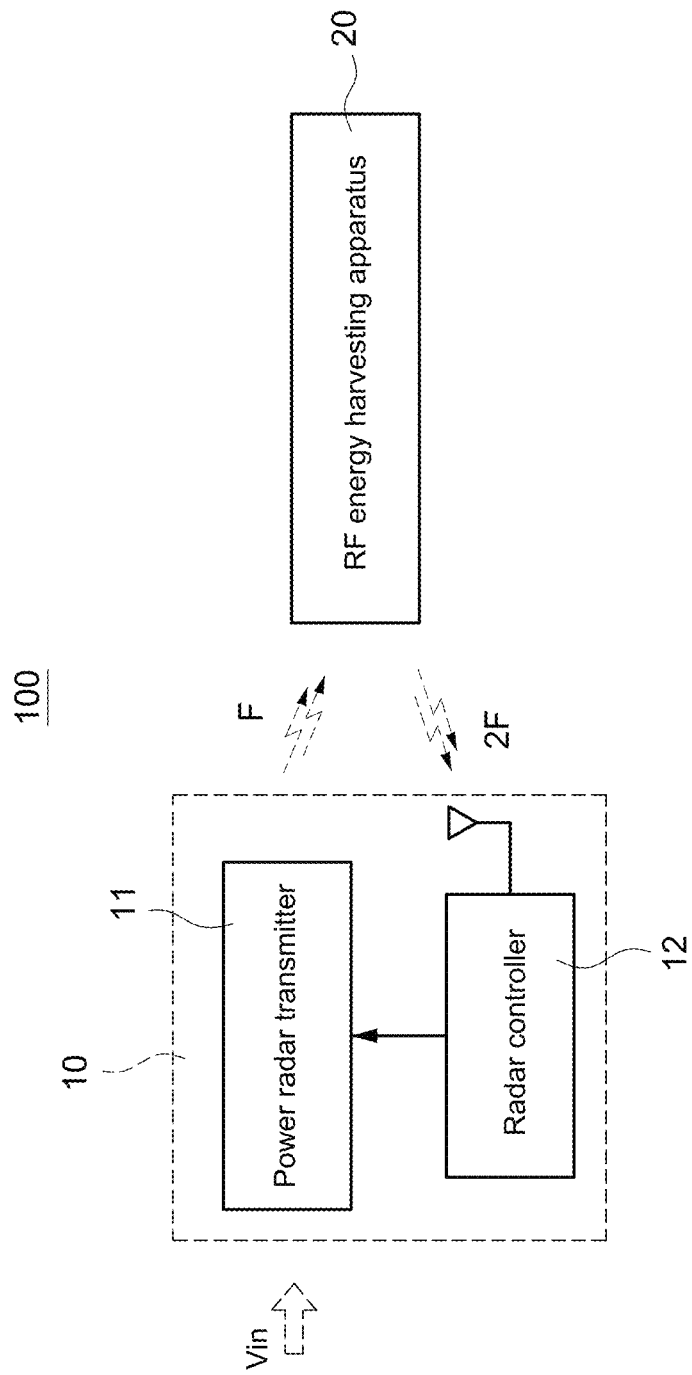
FIG. 1 shows the schematic diagram for the RF energy transferring system of the present disclosure.

FIG. 1 shows the schematic diagram for the RF energy transferring system 100 of the present disclosure. The RF energy transferring system 100 includes an RF energy transmitting apparatus 10 and an RF energy harvesting apparatus 20. The RF energy transmitting apparatus 10 includes a power radar transmitter 11 and a radar controller 12. The power radar transmitter 11 receives a power source signal Vin and emits an electromagnetic source wave F. The radar controller 12 is electrically connected to power radar transmitter 11 and controls the power radar transmitter 11 based on a reflected harmonic wave 2F. The RF energy harvesting apparatus 20 receives the electromagnetic source wave F emitted from the power radar transmitter 11 and generates the reflected harmonic wave 2F, which is received by the radar controller 12. The radar controller 12 determines the polarization angle θh of the reflected harmonic wave 2F and adjusts the polarization angle θr of the power radar transmitter 11, so as to optimize the received energy by the RF energy harvesting apparatus 20.

Figure 2:
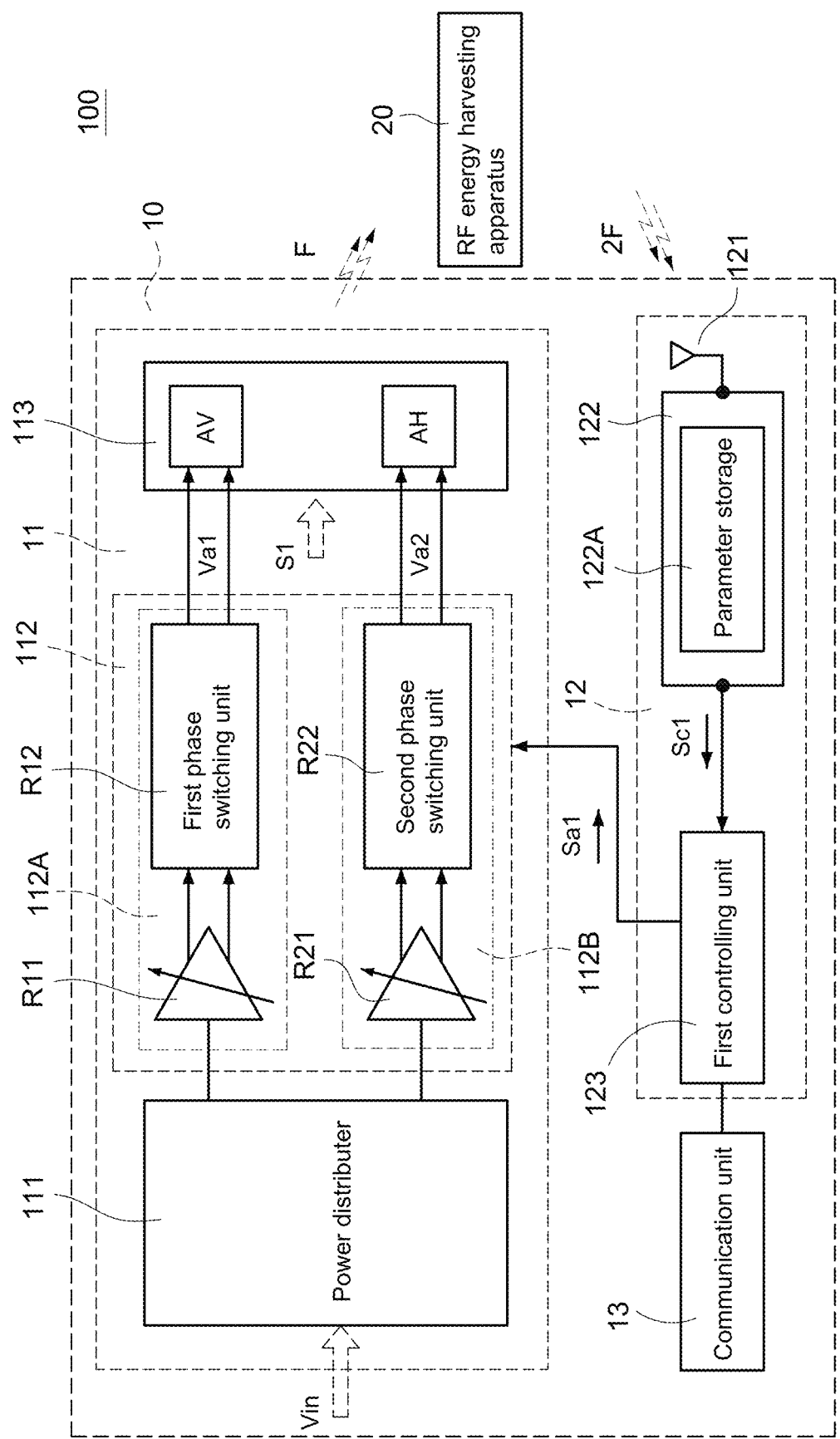
FIG. 2 shows the schematic circuit diagram of the RF energy transmitting apparatus.

FIG. 2 shows the schematic circuit diagram of the RF energy transmitting apparatus 10. Refer to FIG. 1, the power radar transmitter 11 includes a power distributer 111, a first adjusting unit 112 and a polarization antenna 113 where the first adjusting unit 112 is electrically connected to the power distributer 111, the polarization antenna 113 and the radar controller 12. The power distributer 111 receives the power source signal Vin and the polarization antenna 113 emits the electromagnetic source wave F after the adjustment of the first adjusting unit 112. The first adjusting unit 112 includes a first adjusting path 112A and a second adjusting path 112B. The first adjusting path 112A includes a first amplitude adjusting unit R11 and a first phase switching unit R12, where the first amplitude adjusting unit R11 is electrically connected between the power distributer 111 and the first phase switching unit R12. The second adjusting path 112B includes a second amplitude adjusting unit R21 and a second phase switching unit R22, where the second amplitude adjusting unit R21 is electrically connected between the power distributer 111 and the second phase switching unit R22. The polarization antenna 113 includes a vertical polarization antenna AV and a horizontal polarization antenna AH, where the vertical polarization antenna AV is electrically connected to the first phase switching unit R12 and the horizontal polarization antenna AH is electrically connected to the second phase switching unit R22. In the embodiment shown in FIG. 2, the polarization antenna 113 is, for example but not limited to, a linear polarized antenna consisted of a vertically arranged half-wave linear antenna AV and a horizontally arranged half-wave linear antenna AH. However, the polarization antenna 113 may be any antenna with adjustable polarization angle.

As shown in FIG. 2 and referring to FIG. 1, the radar controller 12 includes a receiving antenna 121, a power detector 122 and a first controlling unit 123. The power detector 122 is electrically connected between the receiving antenna 121 and the first controlling unit 123 and the first controlling unit 123 is electrically connected to the first adjusting unit 112. The first adjusting unit 112 receives the reflected harmonic wave 2F and the power detector 122 detects the power of the reflected harmonic wave 2F. The power detector 122 further includes a parameter storage 122A storing a setting parameter Ps for adjusting the polarization antenna 113, and thus store a correct polarization angle for the polarization antenna 113.

As shown in FIG. 2 and referring to FIG. 1, after the power distributer 111 receiving the power source signal Vin, the power distributer 111 distributes the power source signal Vin to the first adjusting unit 112. The first adjusting unit 112 adjusts the amplitude of the power source signal Vin and outputs a first signal S1. Alternatively, the first adjusting unit 112 adjusts the amplitude of the power source signal Vin, and then switches the phases for the adjusted power source signal Vin and outputs the first signal S1. The first signal S1 is a polarization adjusting signal to adjust the polarization angle of the polarization antenna 113, and the polarization antenna 113, upon receiving the first signal S1, emits the electromagnetic source wave F toward the RF energy harvesting apparatus 20. The RF energy harvesting apparatus 20 emits the reflected harmonic wave 2F, which is the second harmonic wave component of the wave reflected by the RF energy harvesting apparatus 20 and has frequency twice of the electromagnetic source wave F. The receiving antenna 121 receives the reflected harmonic wave 2F, the power detector 122 detects the power of the reflected harmonic wave 2F and then outputs a first control signal Sc1 to the first controlling unit 123. At this time, the power detector 122 stores the power of the reflected harmonic wave 2F in the parameter storage 122A. The first controlling unit 123 obtains the polarization angle θh of the reflected harmonic wave 2F of the RF energy harvesting apparatus 20. At this time, the first controlling unit 123 outputs a first adjusting signal Sa1 to adjust the amplitude and phase of the power source signal Vin, and thus adjust the polarization angle θr of the polarization antenna 113. In this embodiment, the parameter storage 122A records a setting parameter Ps for adjusting the polarization antenna 113, and thus enables the polarization antenna 113 to have correct polarization. Therefore, the parameter storage 122A does not need to be in the power detector 122. In other embodiment, the parameter storage 122A may be arranged independently with the power detector 122 and electrically connected between the power detector 122 and the first controlling unit 123. Moreover, in this embodiment, the frequency of the electromagnetic source wave F is 915 MHz, and the frequency of the reflected harmonic wave 2F (the second harmonic wave corresponding to the electromagnetic source wave F) is 1830 MHz. However, the scope of the present disclosure is not limited by above example, and the present disclosure can be realized as long as the frequencies of the electromagnetic source wave F and the reflected harmonic wave 2F are operable by the RF energy transferring system 100.

As shown in FIG. 2 and referring to FIG. 1, the first signal S1 includes a first adjusting voltage Va1 and a second adjusting voltage Va2. The polarization angle θr of the polarization antenna 113 includes the polarization angle θrv of the vertical polarization antenna AV and the polarization angle θrh of the horizontal polarization antenna AH. The power distributer 111 distributes the power source signal Vin to the first adjusting path 112A and the second adjusting path 112B of the first adjusting unit 112. The first amplitude adjusting unit R11 of the first adjusting path 112A adjusts the amplitude of the power source signal Vin based on the first adjusting signal Sa1 and the first phase switching unit R12 switches the phase of the amplitude-adjusted power source signal Vin, and thus output the first adjusting voltage Va1. Therefore, the first adjusting voltage Va1 of the first signal S1 adjusts the amplitude (or both the amplitude and the phase of the vertical polarization antenna AV), and thus adjust the polarization angle θrv of the vertical polarization antenna AV. The second amplitude adjusting unit R21 of the second adjusting path 112B adjusts the amplitude of the power source signal Vin based on the first adjusting signal Sa1 and the second phase switching unit R22 switches the phase of the amplitude-adjusted power source signal Vin, and thus output the second adjusting voltage Va2. Therefore, the second adjusting voltage Va2 of the first signal S1 adjusts the amplitude (or both the amplitude and the phase of the horizontal polarization antenna AH), and thus adjust the polarization angle θrh of the horizontal polarization antenna AH. The first adjusting unit 112 adjusts the polarization angle θrv of the vertical polarization antenna AV by changing the first adjusting voltage Va1 and adjusts the polarization angle θrh of the horizontal polarization antenna AH by changing the second adjusting voltage Va2. The polarization angle θr of the polarization antenna 113 can be adjusted to be within a predetermined range θp with respect to (such as centered around) the polarization angle θh of the reflected harmonic wave 2F by adjusting the polarization angle θrv of the vertical polarization antenna AV and the polarization angle θrh of the horizontal polarization antenna AH. Within the predetermined range θp, the RF energy harvesting apparatus 20 having the polarization angle θh can receive the energy transmitted from the RF energy transmitting apparatus 10 having polarization angle θr with optimal efficiency. Moreover, the first amplitude adjusting unit R11 and the second amplitude adjusting unit R12 mainly adjusts the power source signal Vin to control the amplitudes of the signals sent from the vertical polarization antenna AV and the horizontal polarization antenna AH. The first phase switching unit R12 and the second phase switching unit R22 mainly provide 180 degree phase switch. Due to the arrangement environment of the power radar transmitter 11 and the RF energy harvesting apparatus 20, the first phase switching unit R12 and the second phase switching unit R22 may provide 180 degree or 360 degree phase switch. Therefore, the first adjusting path 112A and the second adjusting path 112B may adjust the amplitude of the power source signal Vin (with fixed phase of 180 degree) based on the first adjusting signal Sa1 to obtain the first signal S1; or the first adjusting path 112A and the second adjusting path 112B may adjust the amplitude of the power source signal Vin based on the first adjusting signal Sa1 and then switch the phase to be 180 degree or 360 degree to obtain the first signal S1. The polarization angle θr may range from 0 degree to 180 degree and the polarization angle θr with optimal efficiency may be between 0 degree and 180 degree. When the horizontal polarization antenna AH is fixed to have phase of 0 degree and the vertical phase is also correspondingly 0 degree, the amplitudes of the signals output from the first adjusting path 112A and the second adjusting path 112B are controlled to obtain polarization angle between 0 degree and 90 degree. The polarization angle between 90 degree and 270 degree can be obtained when the horizontal phase is 180 degree.

It should be noted that the polarization angle θr for maximizing the efficiency of the RF energy harvesting apparatus 20 has an error value (namely, a tolerance value). Thus, the predetermined angle range θp is preferably to be within 10% of the optimal polarization angle θr. Moreover, the first adjusting unit 112 is functioned to adjust the amplitudes of the first adjusting signal Sa1 and the second adjusting signal Sa2 and to switch the phases of the first adjusting signal Sa1 and the second adjusting signal Sa2. Therefore, the scope of the present disclosure is not limited by the example of using amplitude adjusting unit and phase switching unit, while any means capable of adjusting amplitude and phase should be within the scope of the present disclosure. Moreover, in this embodiment, the reflected harmonic wave 2F received by the radar controller 12 is used to know the polarization angle θh of the RF energy harvesting apparatus 20. The reflected harmonic wave 2F is not limited to second harmonic wave and may be harmonic wave of other orders.

As shown in FIG. 2 and referring to FIG. 1, the RF energy transmitting apparatus 10 further includes a communication unit 13 electrically connected to the first controlling unit 123 to provide communication of the RF energy transmitting apparatus 10 with external interface or other RF energy transmitting apparatus (not shown). For example, the RF energy transferring system may have a plurality of the RF energy transmitting apparatuses 10 and each of the RF energy transmitting apparatuses 10 includes the communication unit 13 electrically connected to the first controlling unit 123 of the radar controller 12. Each of the RF energy transmitting apparatuses 10 may communicate with each other with the communication unit 13. When one of the RF energy transmitting apparatuses 10 detects the RF energy harvesting apparatus 20, this RF energy transmitting apparatus 10 informs the other RF energy transmitting apparatus via the communication unit 13 to prevent the potential line-of-sight problem for the other RF energy transmitting apparatus, which may cause ineffective transmission of the electromagnetic source wave F to the RF energy harvesting apparatus 20.

Figure 3:
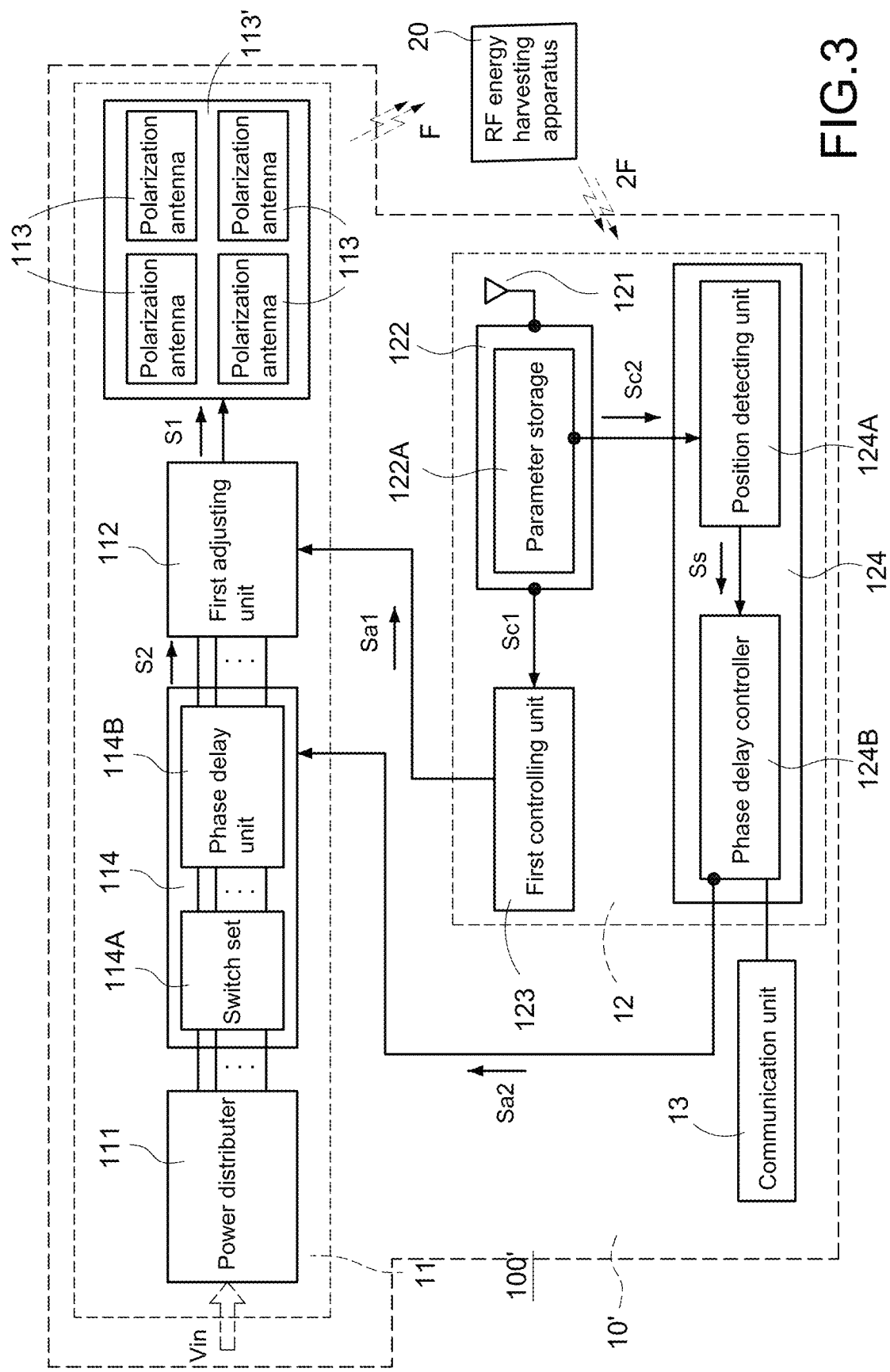
FIG. 3 shows the schematic diagram of the RF energy transmitting apparatus according to another embodiment of the present disclosure.

FIG. 3 shows the schematic diagram of the RF energy transmitting apparatus 10' according to another embodiment. With reference to FIGS. 1-2, the RF energy transmitting apparatus 10' in the RF energy transferring system 100' has additional a second adjusting unit 114 in comparison with the embodiment in FIG. 2, where the second adjusting unit 114 is electrically connected between the power distributer 111 and the first adjusting unit 112 and received the power source signal Vin distributed by the e power source signal Vin. Moreover, in the RF energy transmitting apparatus 10' shown in FIG. 3, the first adjusting unit 112 is electrically connected to an antenna array 113' including a plurality of polarization antennas (such as a plurality of polarization antennas 113). Each of the polarization antennas 113 includes a vertical polarization antenna AV and a horizontal polarization antenna AH. The radar controller 12 further includes a second controlling unit 124 electrically connected between the power detector 122 and the second adjusting unit 114. By virtue that the antenna array 113' includes a plurality of polarization antennas 113, and the power radar transmitter 11 may emits the electromagnetic source wave F to scan a space (not shown) and knows the position of the RF energy harvesting apparatus 20, namely the power radar transmitter 11 has positioning function. When the RF energy transmitting apparatus 10' has positioned the RF energy harvesting apparatus 20, the RF energy transmitting apparatus 10' may such adjust the electromagnetic source wave F that the RF energy harvesting apparatus 20 can receive more power density. Moreover, the RF energy transmitting apparatus 10' further adjusts the polarization angle θr of the polarization antenna 113 such that the RF energy harvesting apparatus 20 can receive optimal power.

As shown in FIG. 3 and with reference to FIGS. 1~2, the second controlling unit 124 includes a position detecting unit 124A and a phase delay controller 124B, where the position detecting unit 124A is electrically connected between the power detector 122 and the phase delay controller 124B and the phase delay controller 124B is electrically connected to the second adjusting unit 114. The position detecting unit 124A ensures the position of the RF energy harvesting apparatus 20 based on the reflected harmonic wave 2F. The phase delay controller 124B controls the second adjusting unit 114 to adjust the phase of the power source signal Vin distributed by the power distributer 111.

As shown in FIG. 3 and with reference to FIGS. 1~2, the power distributer 111, after receiving the power source signal Vin, distributes the power source signal Vin into a plurality of power signals and sends the power signals to the second adjusting unit 114. The second adjusting unit 114 adjusts the phases of the power signals and then outputs a second signal S2 including the phase-adjusted power signals and applied to the first adjusting unit 112. The second signal S2 is a positioning signal to control the antenna array 113' to emit the electromagnetic source wave F toward a specific location. By the second signal S2, the signal emitting direction of the antenna array 113' can be changed. The first adjusting unit 112 adjusts the amplitude of the second signal S2 to be a first signal S1, or adjusts the amplitude of the power source signal Vin (followed by phase switching) to be a first signal S1. The first adjusting unit 112 outputs the first signal S1 to the antenna array 113'. The antenna array 113, after receiving the first signal S1, performs scanning by emitting the electromagnetic source wave F toward a space. The RF energy harvesting apparatus 20, after receiving the electromagnetic source wave F, emits a reflected harmonic wave including the reflected harmonic wave 2F, where the reflected harmonic wave 2F has frequency as second harmonic wave of the electromagnetic source wave F.

After the receiving antenna 121 receives the reflected harmonic wave 2F, the power detector 122 detects the power of the reflected harmonic wave 2F and outputs a first control signal Sc1 to the first controlling unit 123 and outputs a second control signal Sc2 to the second controlling unit 124. At this time, the power detector 122 stores the power of the reflected harmonic wave 2F to the parameter storage 122A. The second controlling unit 124 may know the position of the RF energy harvesting apparatus 20 based on the second control signal Sc2. The position detecting unit 124A in the second controlling unit 124 determined the position of the RF energy harvesting apparatus 20 based on the second control signal Sc2 output by the power detector 122, the position detecting unit 124A then outputs a position signal Ss to the phase delay controller 124B. The phase delay controller 124B outputs the second adjusting signal Sa2 to the second adjusting unit 114 based on the position signal Ss and the second adjusting unit 114 adjusts the phase of the power source signal Vin distributed by the power distributer 111. The second adjusting unit 114, after adjusting the phase of the power source signal Vin distributed by the power distributer 111, sends a second signal S2 to the first adjusting unit 112. At this time, the second signal S2 is corresponding to the location of the RF energy harvesting apparatus 20 (namely not for scanning purpose). The first adjusting unit 112 adjusts the second signal S2 into the first signal S1 and outputs the first signal S1 to the antenna array 113' to change the wave emitting direction of the antenna array 113'. Therefore, at this time, the antenna array 113' can emit the electromagnetic source wave F toward the location of the RF energy harvesting apparatus 20. In one example, the second controlling unit 124 controls the second adjusting unit 114 by digital modulation. In another example, the second controlling unit 124 performs control in analog modulation scheme, and the second adjusting unit 114 is an analog phase-adjusting unit with continual phase adjustment.

When the RF energy harvesting apparatus 20 again receives the electromagnetic source wave F, the RF energy harvesting apparatus 20 again reflects the reflected harmonic wave 2F. When the receiving antenna 121 again receives the reflected harmonic wave 2F, the power detector 122 detects the power of the reflected harmonic wave 2F and outputs the first control signal Sc1 to the first controlling unit 123. At this time, the first controlling unit 123 stores the power of the reflected harmonic wave 2F to the parameter storage 122A. The first controlling unit 123 knows the polarization angle θh of the RF energy harvesting apparatus 20 after receiving the first control signal Sc1. At this time, the first controlling unit 123 outputs the first adjusting signal Sa1 to the first adjusting unit 112 and the first adjusting unit 112 adjusts the amplitude of the second signal S2 based on the first adjusting signal Sa1 (or adjusts the amplitude of the second signal S2 and then switches the phase of the second signal S2 based on the first adjusting signal Sa1) and then outputs the first signal S1 to the antenna array 113'. The antenna array 113' adjusts the polarization angles of the polarization antennas 113 based on the first signal S1 to align the polarization angle θr of the RF energy transmitting apparatus 10' to the polarization angle θh of the RF energy harvesting apparatus 20, and thus enable the RF energy harvesting apparatus 20 to receive maximal power from the RF energy transmitting apparatus 10'. The first adjusting unit 112 in FIG. 3 is different with the first adjusting unit 112 in FIG. 2 in that the first signal S1 output by the first adjusting unit 112 in FIG. 2 only adjusts the amplitude (or amplitude and phase) of the polarization antennas 113 while the first signal S1 output by the first adjusting unit 112 in FIG. 3 has positioning function beside the adjustment of amplitude (or amplitude and phase) of the polarization antennas 113. Therefore, the first signal S1 output by the first adjusting unit 112 in FIG. 3 can adjust the antenna array 113' for positioning.

As shown in FIG. 3 and with reference to FIGS. 1~2, the second adjusting unit 114 includes a switch set 114A and a phase delay unit 114B, and the second adjusting unit 114 functions to adjust the phase of the power source signal Vin distributed by the power distributer 111. The switch set 114A includes a plurality of switches (not shown) and electrically connected to the power distributer 111. The phase delay unit 114B provides phase delay with phase angles from 0 degree to −360 degree, and is electrically connected between the switch set 114A and the first adjusting unit 112. Based on the second adjusting signal Sa2, the second adjusting unit 114 controls the switches in the switch set 114A to turn on or turn off to provide phase delay with phase angles from 0 degree to −360 degree, and thus convert the power source signal Vin (distributed by the power distributer 111) to the second signal S2. The antenna array 113' may be one-dimensional array or two-dimensional array (such as 2×2 array of polarization antennas 113 or polarization antennas 113 larger than 2×2 array). By controlling the second adjusting unit 114 with the second adjusting signal Sa2, the second signal S2 has phase angle of 0 degree, +90 degree or −90 degree phase delay. Therefore, the electromagnetic source wave F emitted by the antenna array 113' can be controlled to point to a specific direction and the optimal direction of the electromagnetic source wave F depends on the location of the RF energy harvesting apparatus 20. The second adjusting unit 114 uses the phase angle of 0 degree, +90 degree or −90 degree phase delay to adjust the phase of the power source signal Vin (distributed by the power distributer 111). The second adjusting unit 114 may be implemented by other scheme than the disclosed switch set 114A and phase delay unit 114B.

As shown in FIG. 3 and with reference to FIGS. 1~2, the RF energy transmitting apparatus 10' further includes a communication unit 13 electrically connected to the second controlling unit 124 to provide communication of the RF energy transmitting apparatus 10 with external interface or other RF energy transmitting apparatus (not shown). For example, the RF energy transferring system 100' may include a plurality of the RF energy transmitting apparatuses 10' and each of the RF energy transmitting apparatuses 10' includes the communication unit 13 electrically connected to the second controlling unit 124 of the radar controller 12. Each of the RF energy transmitting apparatuses 10' may communicate with each other with the communication unit 13. When one of the RF energy transmitting apparatuses 10' detects the RF energy harvesting apparatus 20, this RF energy transmitting apparatus 10' informs the other RF energy transmitting apparatus via the communication unit 13 to prevent the potential line-of-sight problem for the other RF energy transmitting apparatus, which may cause ineffective transmission of the transceiver antenna 2110 the RF energy harvesting apparatus 20. In addition, the communication unit 13 functions to provide the communication of the RF energy transmitting apparatus 10' with external interface or other RF energy transmitting apparatus such that the communication unit 13 does not need to directly connect to the second controlling unit 124. The communication unit 13 may be electrically connected to the first controlling unit 123 (as shown in FIG. 2) or the radar controller 12 and still achieves the communication of the RF energy transmitting apparatus 10' with external interface or other RF energy transmitting apparatus.

Figure 4:
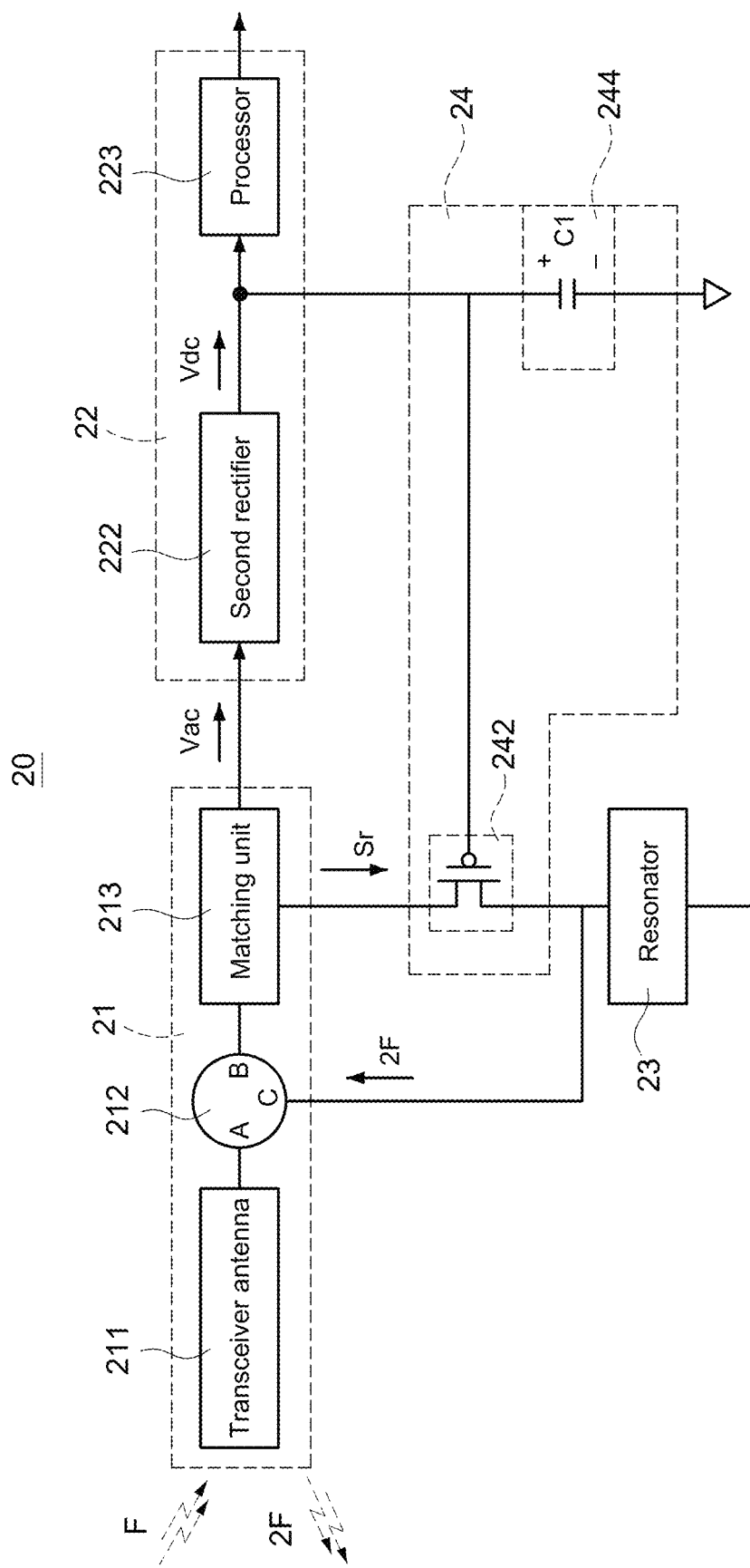
FIG. 4 shows the circuit block diagram of the RF energy harvesting apparatus according to the first embodiment of the present disclosure.

FIG. 4 shows the circuit block diagram of the RF energy harvesting apparatus 20 according to the first embodiment of the present disclosure. With reference to FIGS. 1~3, the RF energy harvesting apparatus 20 includes an RF transceiver module 21, a power module 22 and a resonator 23. The RF transceiver module 21 receives the electromagnetic source wave F and emits the reflected harmonic wave 2F. The power module 22 is electrically connected to the RF transceiver module 21 and the resonator 23 is also electrically connected to the RF transceiver module 21. The RF transceiver module 21 includes a transceiver antenna 211, a circulator 212 and a matching unit 213, where the transceiver antenna 211 receives the electromagnetic source wave F and emits the reflected harmonic wave 2F. The circulator 212 is electrically connected between the transceiver antenna 211 and the resonator 23, and the matching unit 213 is electrically connected between the circulator 212 and the resonator 23. The power module 22 includes a second rectifier 222 and a processor 223 and the second rectifier 222 is electrically connected between the matching unit 213 and the processor 223. The processor 223 is used for sensor or application circuit with tag. However, the scope of the present disclosure is not limited by above example. Therefore, the processor 223 can be any processing circuit capable of providing electric energy to other backend application device (not shown). Moreover, in the shown embodiment, the transceiver antenna 211 may be a dual-band antenna and can emit and receive RF signals of different frequencies. However, the scope of the present disclosure is not limited by above example, and the transceiver antenna 211 may be any antenna capable of receiving RF signals of different frequencies.

The circulator 212 includes a first end A, a second end B and a third end C, where the first end A is electrically connected to the transceiver antenna 211, the second end B is electrically connected to the matching unit 213, and the third end C is electrically connected to the resonator 23. The resonator 23 allows the signal transmission from the first end A to the second end B, from the second end B to the third end C, and from the third end C to the first end A; and forbids the signal transmission from the second end B to the first end A, from the third end C to the second end B, and from the first end A to the third end C. It should be noted the resonator 23 can be replaced by other device (such as energy coupler) as long as the above signal path rule can be achieved.

As shown in FIG. 4 and with reference to FIGS. 1~3, after the transceiver antenna 211 receives the electromagnetic source wave F, the electromagnetic source wave F is output, via the circulator 212, to the matching unit 213 for impedance matching. The matching unit 213 outputs an alternating voltage source Vac to the second rectifier 222 and outputs a reflection signal Sr (second harmonic wave) to the resonator 23. The resonator 23 enhances the reflection signal Sr for generation of the reflected harmonic wave 2F, and outputs the reflected harmonic wave 2F to the transceiver antenna 211. The transceiver antenna 211 emits the reflected harmonic wave 2F to the RF energy transmitting apparatus 10 after it receives the reflected harmonic wave 2F, and thus facilitate the adjustment of the polarization angle θr of the polarization antenna 13 in the RF energy transmitting apparatus 10 to be within the predetermined angle range θp with respect to the polarization angle θr of the reflected harmonic wave 2F. The second rectifier 222 receives the alternating voltage source Vac and converts the alternating voltage source Vac into a DC voltage source Vdc for supplying to the processor 223.

As shown in FIG. 4 and with reference to FIGS. 1~3, in case that the RF energy harvesting apparatus 20 does not have battery with large capacity, the resonator 23 can be turned off to save the power consumption by the RF energy harvesting apparatus 20 when the polarization angle θr of the polarization antenna 113 in the RF energy transmitting apparatus 10 is adjusted to be within the predetermined angle range θp with respect to the polarization angle θr of the reflected harmonic wave 2F. Therefore, the RF energy harvesting apparatus 20 further includes a switch set 24 including a switch unit 242 and an energy storage unit 244. The switch unit 242 is electrically connected between the matching unit 213 and the resonator 23 and the energy storage unit 244 is electrically connected to the second rectifier 222 and the switch unit 242. The DC voltage source Vdc converted by the second rectifier 222 can charge the energy storage unit 244. When the second rectifier 222 just begins to supply the DC voltage source Vdc, the energy storage unit 244 is not charged and equivalent to shorted circuit, namely lacking the capability to supply power for the processor 223. The control end (gate end) of the switch unit 242 is low level and the switch unit 242 is turned on due to the shorted circuit of the energy storage unit 244. When the switch unit 242 is turned on, the resonator 23 enhances the reflection signal Sr for generation of the reflected harmonic wave 2F, and outputs the reflected harmonic wave 2F, via the circulator 212, to the transceiver antenna 211. The transceiver antenna 211 emits the reflected harmonic wave 2F to the RF energy transmitting apparatus 10 after it receives the reflected harmonic wave 2F. After the DC voltage source Vdc continually charges the energy storage unit 244, the voltage across the energy storage unit 244 increases and the switch unit 242 will be turned off, namely, the electric connection between the resonator 23 and the matching unit 213 will be cut off. It should be noted that the matching unit 213 and the second rectifier 222 have circuit components inducing second harmonic generation for the electromagnetic source wave F, and thus a reflection signal Sr with second harmonic component is sent from the matching unit 213 to the resonator 23. The resonator 23 enhances the reflection signal Sr to be the reflected harmonic wave 2F, and thus enhance the sensitivity of the RF energy transmitting apparatus 10 for detecting the RF energy harvesting apparatus 20.

When the RF energy transmitting apparatus 10 receives the reflected harmonic wave 2F and then adjusts the polarization angle θr of the polarization antenna 113 in the RF energy transmitting apparatus 10 to be within the predetermined angle range θp with respect to the polarization angle θr of the reflected harmonic wave 2F, at this time, the energy storage unit 244 is already charged by the DC voltage source Vdc to have stable electric energy for supplying the processor 223. Moreover, a high level voltage is established across the energy storage unit 244 such that the control end (gate end) of the switch unit 242 is also high level and the switch unit 242 is turned off. Namely, by charging the energy storage unit 244 with the DC voltage source Vdc to a status of capable of turning off the switch unit 242, the resonator 23 can also be turned off. At this time, the electromagnetic source wave F is receive by the transceiver antenna 211 and supplies to the processor 223 via the circulator 212, the matching unit 213 and the second rectifier 222. The switch module 24 can turn on/off the resonator 23 to save the power consumption of the RF energy harvesting apparatus 20 during operation. Moreover, at the moment that the a high level voltage is established across the energy storage unit 244 to turn off the switch unit 242, the polarization angle θr of the polarization antenna 113 in the RF energy transmitting apparatus 10 may not be adjusted to within the predetermined angle range θp with respect to the polarization angle θh of the reflected harmonic wave 2F. The RF energy harvesting apparatus 20 may not receive the maximal (optimal) power.

Therefore, a delay unit (not shown) may be added between the energy storage unit 244 and the switch unit 242, or between the second rectifier 222 and the energy storage unit 244. The delay unit functions to delay the turning off time of the switch unit 242 to prolong the time by which the polarization antenna 113 adjusts the polarization angle θr of the polarization antenna 113. Therefore, the polarization angle θr of the polarization antenna 113 in the RF energy transmitting apparatus 10 has sufficient time to adjust to within the predetermined angle range θp with respect to the polarization angle θh of the reflected harmonic wave 2F, and the RF energy harvesting apparatus 20 can achieve optimal power reception. In this embodiment, the switch unit 242 is implemented with CMOS transistor. However, this is not limitation of the present disclosure and any switch with turning on/off function is within the scope of the present disclosure.

Figure 5:
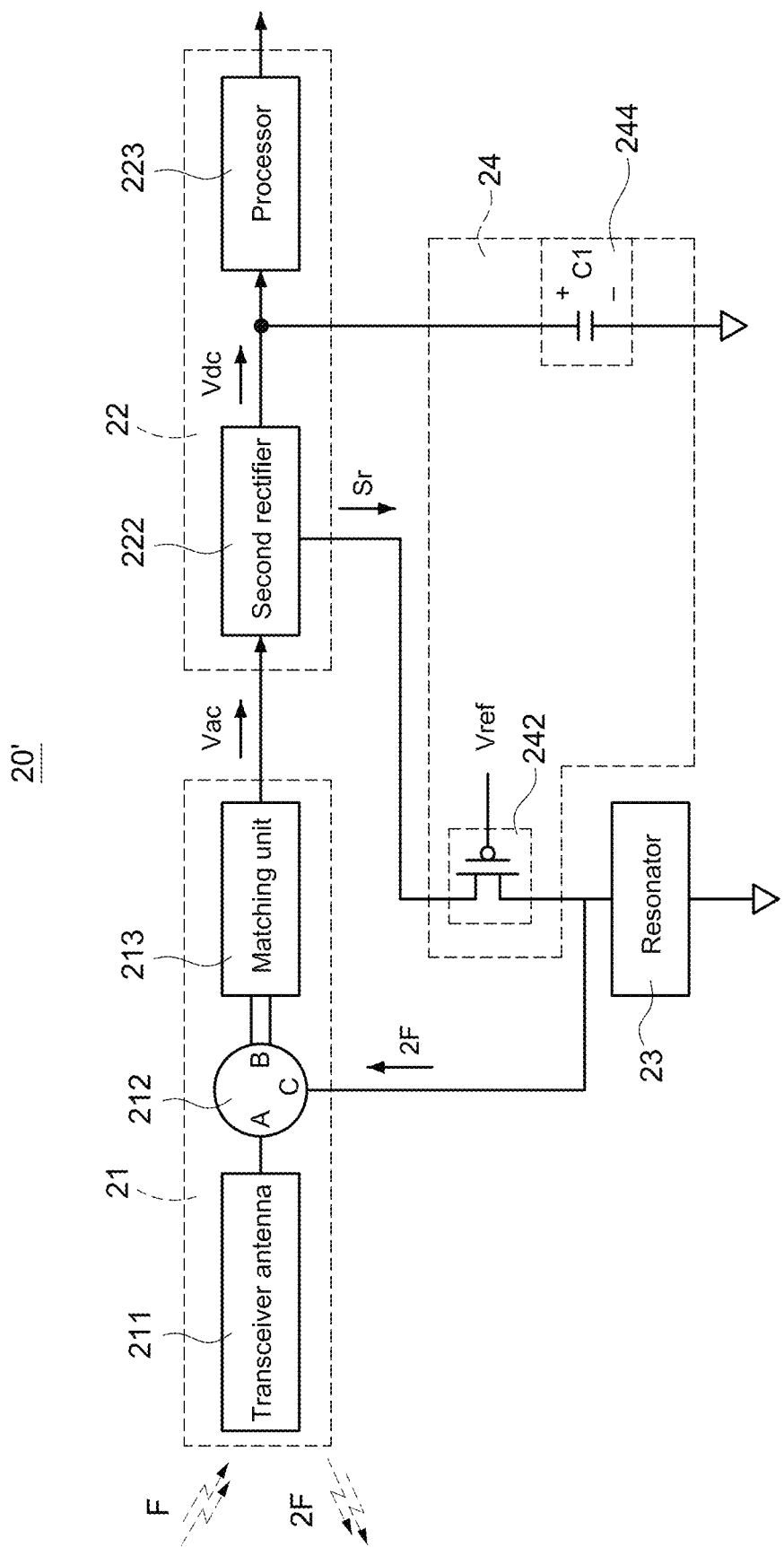
FIG. 5 shows the circuit block diagram of the RF energy harvesting apparatus according to the second embodiment of the present disclosure.

FIG. 5 shows the circuit block diagram of the RF energy harvesting apparatus 20 according to the second embodiment of the present disclosure. With reference to FIGS. 1~4, the embodiment in FIG. 5 is different to the embodiment in FIG. 4 in that the switch module 24 further includes a switch unit 242 and energy storage 2244, where the switch unit 242 and the energy storage 2244 are electrically connected to the second rectifier 222. The switch unit 242 receives a reference voltage Vref and turning on/off of the switch unit 242 is controlled by the reference voltage Vref. The second rectifier 222 outputs the reflection signal Sr to the resonator 23 and the resonator 23 enhances the reflection signal Sr to be the reflected harmonic wave 2F for supplying to the circulator 212.

As shown in FIG. 5 and with reference to FIGS. 1~4, when the transceiver antenna 211 receives the electromagnetic source wave F, the Electromagnetic source wave F outputs, via the circulator 212, to the matching unit 213 for impedance matching. The matching unit 213 outputs an alternating voltage source Vac to the second rectifier 222. The second rectifier 222 rectifies the alternating voltage source Vac to a DC voltage source Vdc, outputs a reflection signal Sr (with second harmonic component) to the resonator 23 and supplies the DC voltage source Vdc to charge the energy storage unit 244.

As shown in FIG. 5 and with reference to FIGS. 1~4, in case that the RF energy harvesting apparatus 20 does not have battery with large capacity, the resonator 23 can be turned off to save the power consumption by the RF energy harvesting apparatus 20 when the polarization angle θr of the polarization antenna 113 in the RF energy transmitting apparatus 10 is adjusted to be within the predetermined angle range θp with respect to the polarization angle θr of the reflected harmonic wave 2F. When the second rectifier 222 just begins to supply the DC voltage source Vdc, the energy storage unit 244 is not charged and equivalent to shorted circuit, namely lacking the capability to supply power for the processor 223. At this time, the reference voltage Vref cannot turn on/off the switch unit 242 or no reference voltage Vref is supplied to the switch unit 242. Therefore, the control end (gate end) of the switch unit 242 is low level and the switch unit 242 is turned on due to the shorted circuit of the energy storage unit 244. When the switch unit 242 is turned on, the resonator 23 enhances the reflection signal Sr for generation of the reflected harmonic wave 2F, and outputs the reflected harmonic wave 2F, via the circulator 212, to the transceiver antenna 211. The transceiver antenna 211 emits the reflected harmonic wave 2F to the RF energy transmitting apparatus 10 after it receives the reflected harmonic wave 2F. After the DC voltage source Vdc continually charges the energy storage unit 244, the voltage across the energy storage unit 244 increases to supply electric power to the processor 223. When the DC voltage source Vdc continually charges the energy storage unit 244, the reference voltage Vref gradually turns off the electric connection between the resonator 23 and the second rectifier 222 in the power module 22.

When the RF energy transmitting apparatus 10 receives the reflected harmonic wave 2F and then adjusts the polarization angle θr of the polarization antenna 113 in the RF energy transmitting apparatus 10 to be within the predetermined angle range θp with respect to the polarization angle θr of the reflected harmonic wave 2F, the energy storage unit 244 is already charged by the DC voltage source Vdc and has stable electric energy for supplying the processor 223. When a voltage is established across the energy storage unit 244 and enough to supply stable electric energy for the processor 223, the reference voltage Vref turns off the switch unit 242 and then turns off the resonator 23. At this time, the electromagnetic source wave F is receive by the transceiver antenna 211 and supplies to the processor 223 via the circulator 212, the matching unit 213 and the second rectifier 222. Moreover, similarly to embodiment in FIG. 4, in this embodiment a delay unit (not shown) may be added between the second rectifier 222 and the energy storage unit 244. The delay unit functions to delay the turning off time of the switch unit 242 to prolong the time by which the polarization antenna 113 adjusts the polarization angle θr of the polarization antenna 113. Therefore, the polarization angle θr of the polarization antenna 113 in the RF energy transmitting apparatus 10 has sufficient time to adjust to within the predetermined angle range θp with respect to the polarization angle θh of the reflected harmonic wave 2F. Moreover, the reference voltage Vref can be supplied by the RF energy harvesting apparatus 20. The reference voltage Vref is, for example but not limited to, supplied by the processor 223 and the processor 223 sends the reference voltage Vref to turn off the switch unit 242 when the processor 223 gets stable supplied power.

Figure 6:
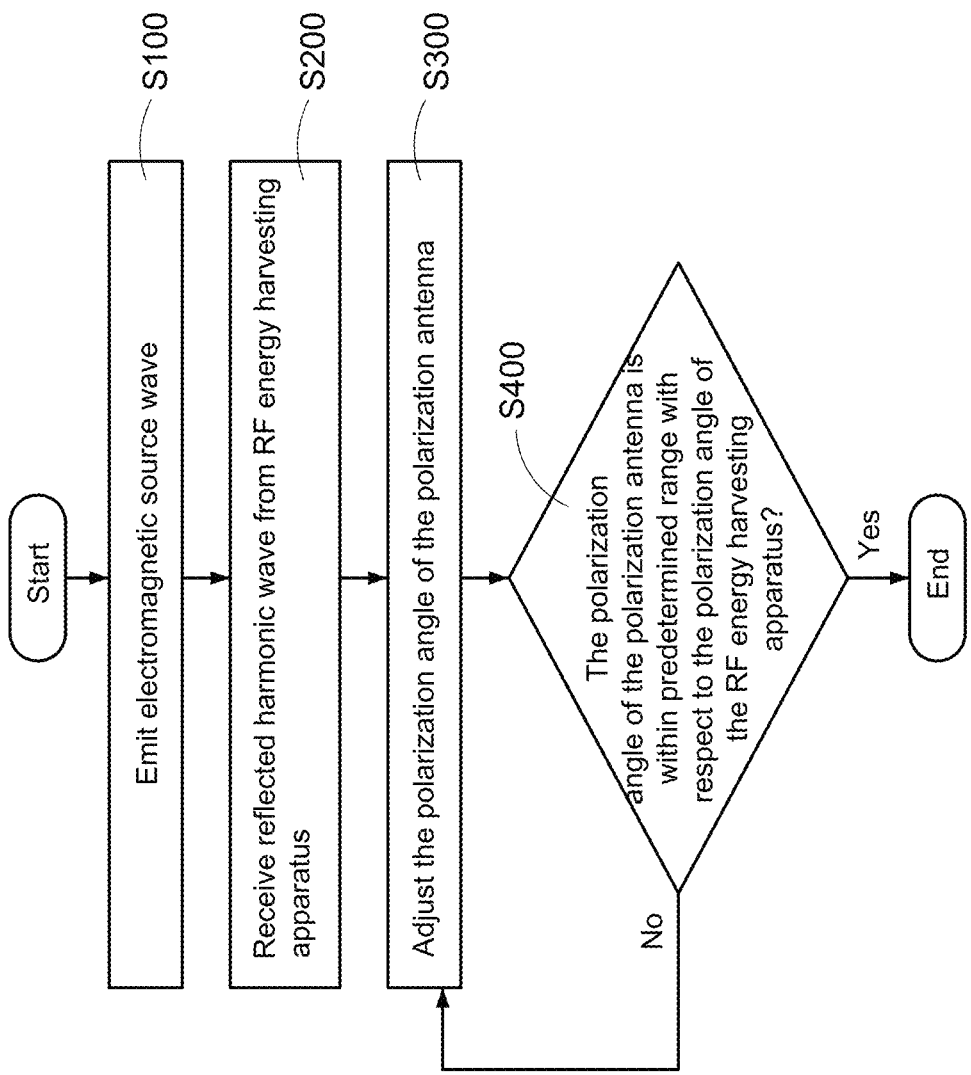
FIG. 6 shows the flowchart for the RF energy transmitting method according to an embodiment of the present disclosure.

FIG. 6 shows the flowchart for the method of RF energy transmitting method according to an embodiment of the present disclosure. Please refer to FIGS. 1~5, the method includes following steps. Firstly, transmitting the electromagnetic source wave (S100), where an RF energy transmitting apparatus 10 sends the electromagnetic source wave F to an RF energy harvesting apparatus 20. The RF energy transmitting apparatus 10 then receives the reflected harmonic wave 2F from the RF energy harvesting apparatus 20 (S200). More particularly, the RF energy harvesting apparatus 20 receives the electromagnetic source wave F and emits the reflected harmonic wave 2F, where the reflected harmonic wave 2F is second harmonic wave of the reflection wave for the electromagnetic source wave F. The polarization angle of the polarization antenna is adjusted (S300). More particularly, after the RF energy transmitting apparatus 10 receives the reflected harmonic wave 2F, the RF energy transmitting apparatus 10 generates a first adjusting signal Sa1 (based on the received reflected harmonic wave 2F) to adjust the first signal S1 in the RF energy transmitting apparatus, and thus adjust the polarization angle θr of the polarization antenna 113 in the RF energy transmitting apparatus 10. The first signal S1 includes a first adjusting voltage Va1 and a second adjusting voltage Va2. The first adjusting voltage Va1 adjusts the amplitude (or amplitude and phase) of the vertical polarization antenna AV, and thus adjust the polarization angle θrv of the vertical polarization antenna AV. The second adjusting voltage Va2 adjusts the amplitude (or amplitude and phase) of the horizontal polarization antenna AH, and thus adjust the polarization angle θrh of the horizontal polarization antenna AH. After the RF energy transmitting apparatus 10 adjusts the polarization angle θr of the polarization antenna 113, the RF energy transmitting apparatus 10 stores the setting parameter Ps in the parameter storage 122A. The setting parameter Ps is, for example but not limited to, the polarization angle θr of the polarization antenna 113 after adjustment, the output power and maximal output power (dB value) emitted by the he RF energy harvesting apparatus 20 (for example the output power and maximal output power related to the reflected harmonic wave 2F), the voltage values of the first adjusting voltage Va1 and the second adjusting voltage Va2, and the impedance value (S2) of the polarization antenna 113 after adjustment. The method further determines whether the polarization angle of the RF energy transmitting apparatus 10 matches a predetermined angle range (S400). The predetermined angle range θp is for example, an angle range centered at the polarization angle θh of the RF energy harvesting apparatus 20. The RF energy transmitting apparatus 10 can send efficient power to the RF energy harvesting apparatus 20 if the polarization angle θr of the polarization antenna 113 is within the predetermined angle range θp.

With reference to FIG. 6 and also reference FIGS. 1~5, if the polarization angle of the RF energy transmitting apparatus 10 is within the predetermined angle range θp, the reflected harmonic wave 2F emitted by the RF energy harvesting apparatus 20 has maximal or nearly maximal reception by the RF energy transmitting apparatus 10. The parameter storage 122A stores the setting parameter Ps corresponding to the predetermined angle range θp, and thus providing correct polarization angle for the polarization antenna 113. The setting parameter Ps is controlling parameter for the predetermined angle range θp and can be the current polarization angle θr, the output power of the RF energy harvesting apparatus 20, the voltage values of the first adjusting voltage Va1 and the second adjusting voltage Va2, and the impedance value (S2) of the polarization antenna 113 after adjustment. The method returns to step S300 to continually adjust the polarization angle of the RF energy transmitting apparatus 10 to be within the predetermined angle range θp if the polarization angle of the RF energy transmitting apparatus 10 is not within the predetermined angle range θp. The step flow is not ended until the polarization angle of the RF energy transmitting apparatus 10 is within the predetermined angle range θp.

Figure 7:
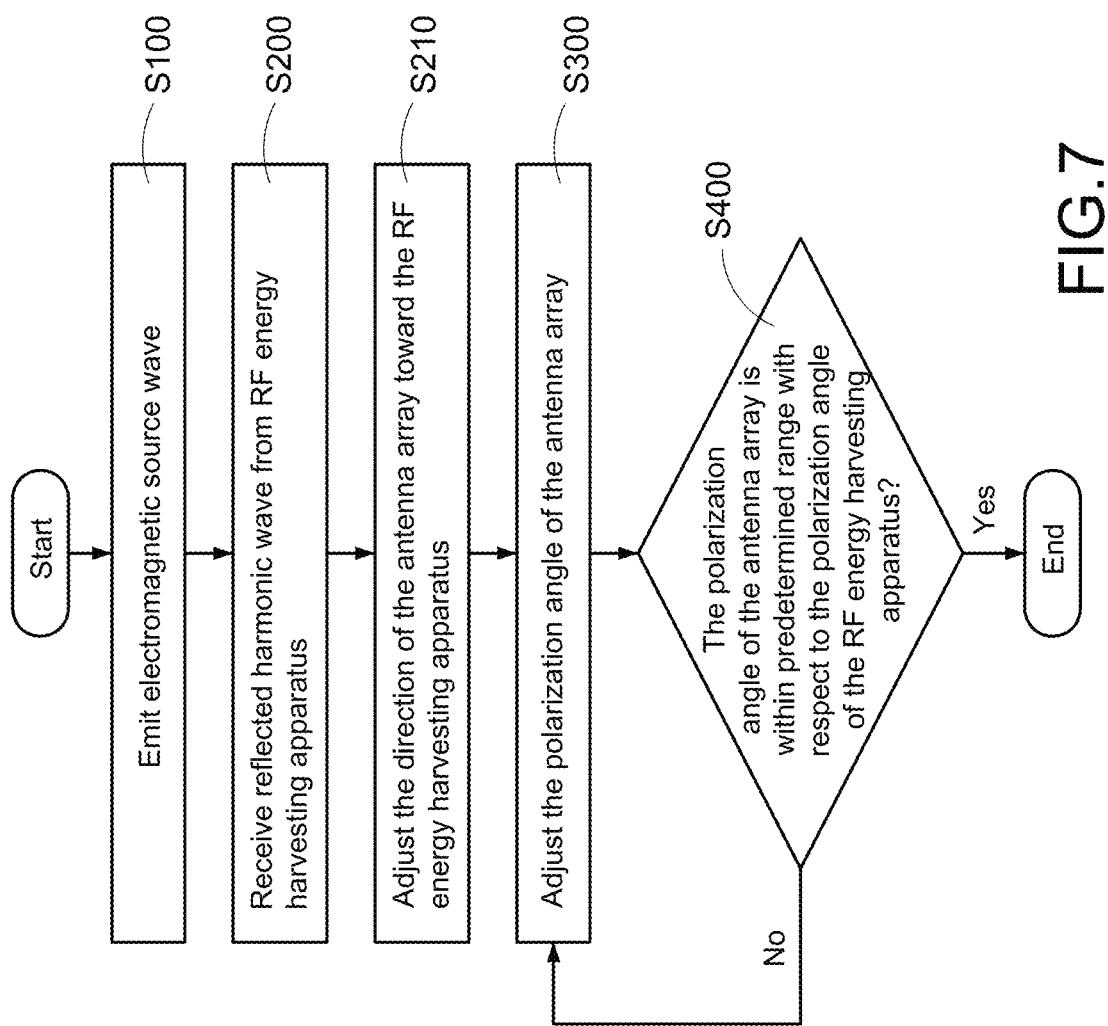
FIG. 7 shows the flowchart for the RF energy transmitting method according to another embodiment of the present disclosure.

FIG. 7 shows the flowchart for the RF energy transmitting method according to another embodiment, and please refer to FIGS. 1~6, the method first transmits the electromagnetic source wave to scan a space (S100), where an RF energy transmitting apparatus 10' sends the electromagnetic source wave F to a space (not shown) to obtain the location of the RF energy harvesting apparatus 20.

The RF energy transmitting apparatus 10' then receives the reflected harmonic wave 2F from the RF energy harvesting apparatus 20 (S200). More particularly, the RF energy harvesting apparatus 20 receives the electromagnetic source wave F and emits the reflected harmonic wave 2F, where the reflected harmonic wave 2F is second harmonic wave of the reflection wave for the electromagnetic source wave F. The direction of the electromagnetic source wave F is adjusted toward the location of the RF energy harvesting apparatus 20 (S210). More particularly, the RF energy transmitting apparatus 10' generates a second adjusting signal Sa2 based on the reflected harmonic wave 2F and then adjusts a second signal S2 based on the second adjusting signal Sa2, and thus adjust an emitting direction for an antenna array 113' in the RF energy transmitting apparatus 10'. When the RF energy transmitting apparatus 10' obtains the location of the RF energy harvesting apparatus 20, the RF energy transmitting apparatus 10' adjusts the emitting direction of the electromagnetic source wave F emitted by the antenna array 113' toward the location of the RF energy harvesting apparatus 20 such that the energy density of the electromagnetic source wave F emitted by the antenna array 113' is relatively high at the location of the RF energy harvesting apparatus 20. Namely, the RF energy harvesting apparatus 20 may receive more power than the device in other locations. Then, the method adjusts the polarization angle of the polarization antenna (S300). More particularly, after the RF energy transmitting apparatus 10 again adjusts the antenna array 113' to emit the electromagnetic source wave F toward the RF energy harvesting apparatus 20 and receives the reflected harmonic wave 2F, the RF energy transmitting apparatus 10' generates a first adjusting signal Sa1 (based on the received reflected harmonic wave 2F) to adjust the first signal S1 in the RF energy transmitting apparatus 10', and thus adjust the polarization angle θr of the polarization antenna 113 in the antenna array 113'. The polarization antenna 113 includes a vertical polarization antenna AV and a horizontal polarization antenna AH.

The first signal S1 includes a first adjusting voltage Va1 and a second adjusting voltage Va2. The first adjusting voltage Va1 adjusts the amplitude (or amplitude and phase) of the vertical polarization antenna AV, and thus adjust the polarization angle θrv of the vertical polarization antenna AV. The second adjusting voltage Va2 adjusts the amplitude (or amplitude and phase) of the horizontal polarization antenna AH, and thus adjust the polarization angle θrh of the horizontal polarization antenna AH. After the RF energy transmitting apparatus 10 adjusts the polarization angle θr of the antenna array 113', the RF energy transmitting apparatus 10' stores the setting parameter Ps in the parameter storage 122A. The setting parameter Ps is, for example but not limited to, the direction of the antenna array 113', the polarization angle θr of the antenna array 113' after adjustment, the output power and maximal output power (dB value) emitted by the he RF energy harvesting apparatus 20 (for example the output power and maximal output power related to the reflected harmonic wave 2F), the voltage values of the first adjusting voltage Va1 and the second adjusting voltage Va2, and the impedance value (S2) of the polarization antenna 113 after adjustment. The method further determines whether the polarization angle of the RF energy transmitting apparatus 10 matches a predetermined angle range (S400). The predetermined angle range θp is for example, an angle range centered at the polarization angle θh of the RF energy harvesting apparatus 20. The RF energy transmitting apparatus 10 can send efficient power to the RF energy harvesting apparatus 20 if the polarization angle θr of the polarization antenna 113 is within the predetermined angle range θp.

With reference to FIG. 7 and also reference FIGS. 1~6, if the polarization angle of the RF energy transmitting apparatus 10' is within the predetermined angle range θp, the reflected harmonic wave 2F emitted by the RF energy harvesting apparatus 20 has maximal or nearly maximal reception by the RF energy transmitting apparatus 10'. The parameter storage 122A stores the setting parameter Ps corresponding to the predetermined angle range θp, and thus providing correct polarization angle for the antenna 113. The setting parameter Ps is controlling parameter for the predetermined angle θp and can be the current direction of the antenna array 113', the current polarization angle θr, the output power of the RF energy harvesting apparatus 20, the voltage values of the first adjusting voltage Va1 and the second adjusting voltage Va2, and the impedance value (S2) of the antenna array 113' after adjustment. The method returns to step S210 to continually adjust the polarization angle of the RF energy transmitting apparatus 10 to be within the predetermined angle range θp if the polarization angle of the RF energy transmitting apparatus 10' is not within the predetermined angle range θp. The step flow is not ended until the polarization angle of the RF energy transmitting apparatus 10' is within the predetermined angle range θp.

To sum up, the present disclosure has following advantages:

1. The resonator enhances reflected harmonic wave component, and thus the polarization antenna of the RF energy transmitting apparatus can be adjusted for optimally matching with an RF energy harvesting apparatus.

2. The power consumption of the backend end device for the RF energy harvesting apparatus can be supplied by the power source signal and the supplied power can be optimized by adjusting the polarization angle of the RF energy transmitting apparatus. The demand of battery for the sensing module can be eliminated.

3. The polarization angle of antenna can be automatically traced with the reflected harmonic wave; the transmission efficient of the RF energy transmitting system is enhanced.

4. By integrating positioning and polarization tracing of antenna array, the RF energy transmitting system has positioning and polarization tracing function without needing additional positioning system.

5. The RF energy harvesting apparatus with rectifying function and harmonic wave reflection function can be realized with only a resonator, a power module and a dual band antenna, the complexity and cost of circuit can be reduced.

Thus, particular embodiments have been described. Other embodiments are within the scope of the following claims. For example, the actions recited in the claims may be performed in a different order and still achieve desirable results.

What is claimed is:

1. An RF energy harvesting apparatus used for an RF energy transmitting apparatus with positioning and polarization tracing function, the RF energy harvesting apparatus comprising:
an RF transceiver module configured to receive an electromagnetic source wave and emit a reflected harmonic wave;
a power module electrically connected to the RF transceiver module; and
a resonator electrically connected to the RF transceiver module and the power module;
wherein the RF transceiver module is configured to output an alternating voltage source to the power module and generate a reflection signal to the resonator after receiving the electromagnetic source wave; the resonator is configured to enhance the reflection signal to form the reflected harmonic wave and output the reflected harmonic wave to the RF transceiver module; the RF transceiver module is configured to emit the reflected harmonic wave to the RF energy transmitting apparatus with positioning and polarization tracing function after the RF transceiver module receives the reflected harmonic wave such that a polarization angle of the RF energy transmitting apparatus is adjusted to be within a predetermined angle range with respect to a polarization angle of the reflected harmonic wave sent from the RF energy harvesting apparatus.

2. The RF energy harvesting apparatus in claim 1, wherein the RF transceiver module comprises:
a transceiver antenna configured to receive the electromagnetic source wave and to emit the reflected harmonic wave;
a circulator electrically connected between the transceiver antenna and the resonator; and
a matching unit electrically connected to the circulator;
wherein the circulator is configured to output the electromagnetic source wave to the matching unit when the transceiver antenna receives the electromagnetic source wave; the matching unit is configured to output the alternating voltage source to the power module and the power module is configured to output the reflection signal to the resonator when the matching unit receives the electromagnetic source wave; the circulator is configured to output the reflected harmonic wave enhanced by the resonator to the RF transceiver module, the reflected harmonic wave emitted by the RF transceiver module has a harmonic component corresponding to the electromagnetic source wave.

3. The RF energy harvesting apparatus in claim 1, wherein the reflected harmonic wave emitted by the RF transceiver module has a second harmonic component corresponding to the electromagnetic source wave.

4. The RF energy harvesting apparatus in claim 2, further comprising:
a switch unit electrically connected between the power module and the resonator, and the switch unit configured to receive a reference voltage; and
an energy storage unit electrically connected to the power module;
wherein the switch unit is turned on, the power module is configured to output the reflection signal to the resonator and to output a DC voltage source to charge the energy storage unit when the matching unit receives the electromagnetic source wave, and the reference voltage is gradually to cut off electric connection between the resonator and power module; the reference voltage turns off the switch unit to cut off the electric connection between the resonator and the power module when the polarization angle of the RF energy transmitting apparatus is adjusted to be within the predetermined angle range with respect to the polarization angle of the reflected harmonic wave sent from the RF energy harvesting apparatus.

5. The RF energy harvesting apparatus in claim 4, wherein the power module comprises
a rectifier electrically connected between the matching unit, the switch unit, and the energy storage unit; and
a processor electrically connected to the rectifier,
wherein the rectifier is configured to convert the alternating voltage source to the DC voltage source, output the reflection signal to the resonator, and output the DC voltage source to charge the energy storage unit when the rectifier receives the alternating voltage source; the switch unit is configured to cut off electric connection between the resonator and the rectifier, and the rectifier is configured to supply the DC voltage source to the processor when the polarization angle of the RF energy transmitting apparatus is adjusted to be within the predetermined angle range with respect to the polarization angle of the reflected harmonic wave sent from the RF energy harvesting apparatus.

* * * * *